United States Patent [19]

Dietrich et al.

[11] Patent Number: 5,362,947
[45] Date of Patent: Nov. 8, 1994

[54] METHOD FOR SHIPPING CHIP CARDS

[75] Inventors: Klaus Dietrich; Stephan Günther; Norbert Knoth; Friedrich-Viktor Miehe; Wolfgang Thiel, all of Berlin, Germany

[73] Assignee: Francotvp-Postalia GmbH, Berlin, Germany

[21] Appl. No.: 822,535

[22] Filed: Jan. 17, 1992

[30] Foreign Application Priority Data

Jan. 17, 1991 [DE] Germany .................. 4101440

[51] Int. Cl.⁵ ............................. G06F 15/20
[52] U.S. Cl. ............................ 235/375; 902/22; 364/464.02; 235/432
[58] Field of Search ............... 235/375, 432; 364/464.02, 464.03; 53/411, 131.4, 284.3; 902/22, 24

[56] References Cited

U.S. PATENT DOCUMENTS

| | | | |
|---|---|---|---|
| 4,644,731 | 2/1987 | Zangheri | 53/411 |
| 4,760,532 | 7/1988 | Sansone et al. | 235/375 X |
| 4,934,846 | 6/1990 | Gilham | 235/375 X |
| 5,257,197 | 10/1993 | Günther et al. | 364/464.02 |

Primary Examiner—Davis L. Willis
Assistant Examiner—Edward Sikorski
Attorney, Agent, or Firm—Herbert L. Lerner; Laurence A. Greenberg

[57] ABSTRACT

A method for sending electrically stored data on flat information carriers requiring postal franking includes transmitting communication data from a personal computer into a memory of an information carrier with a read-write module. Associated shipping data are transmitted from the personal computer to a postage meter device synchronously with the transmission of the communication data. Postal charges for sending the information carrier are accounted for with the postage meter device on the basis of the shipping data. Control data are transmitted from the postage meter device to a printer for printing a postage imprint on each item intended for sending the information carrier. In an apparatus for performing the method, the read-write module may be integrated into the personal computer; the postage meter device may be integrated into the personal computer; the read-write module and the postage meter device may form a structural unit; and the read-write module, the postage meter device and an enveloping station may form a structural unit.

3 Claims, 1 Drawing Sheet

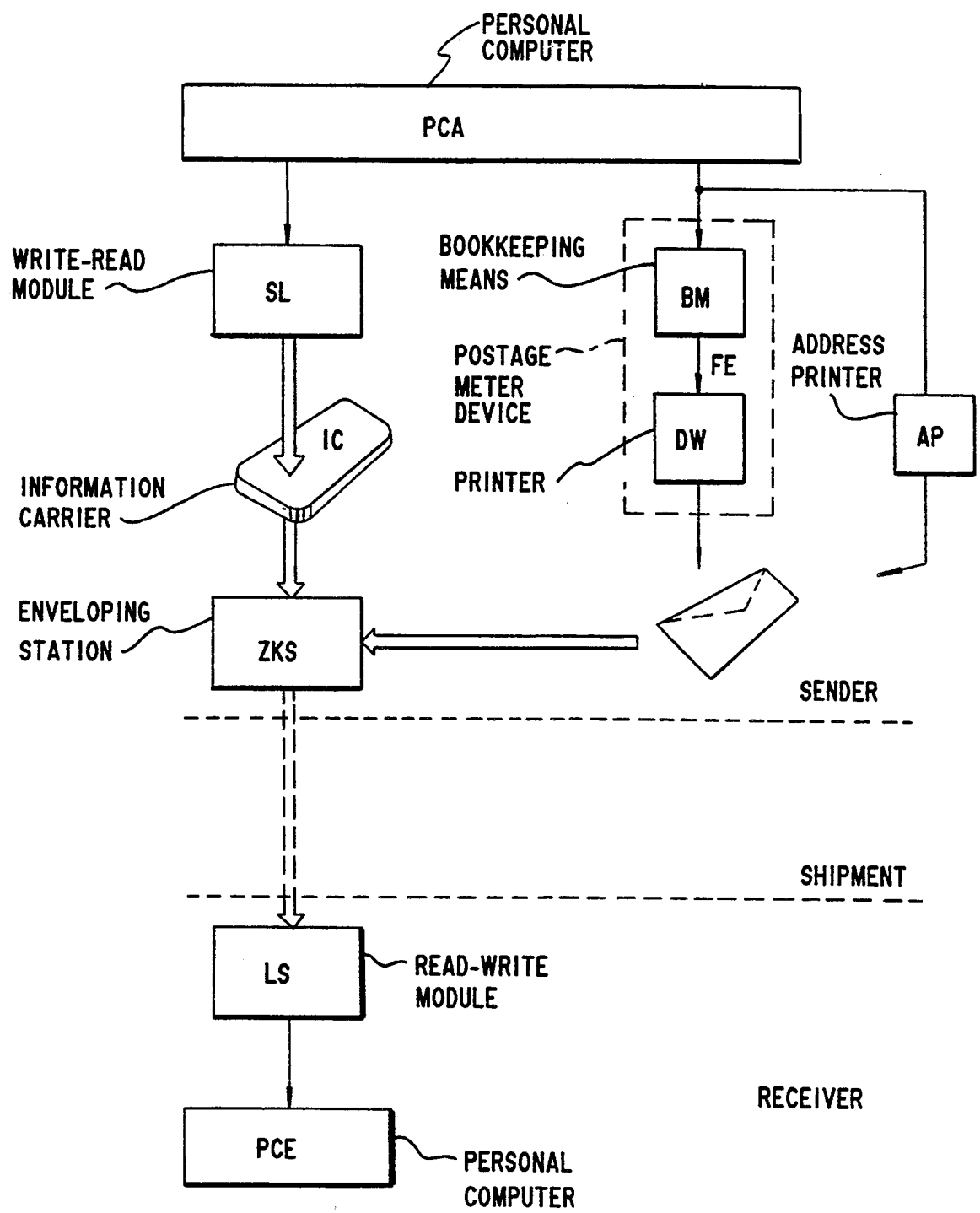

METHOD FOR SHIPPING CHIP CARDS

BACKGROUND OF THE INVENTION

1. Field of the Invention

The invention relates to a method and an apparatus for sending or shipping electrically stored communications or letter contents and/or data on flat information carriers, such as chip cards, that require prepaid postage.

Electronically stored and optionally additionally encoded letter contents or communication data which are, for instance, output to a chip card by a personal computer through a read-write device connected thereto, and are stored in memory in the chip card, may be shipped in the conventional way in an envelope. Chip cards can be sent in order to transmit information or the shipment can be used for a one-time delivery of the chip card to persons in order to make the cards available to them. Depending on the way in which they are to be sent and shipped as well as on the address, mass mailings require the application of different postage values, which would have to be conventionally entered into a postage meter machine by operators.

SUMMARY OF THE INVENTION

It is accordingly an object of the invention to provide a method and an apparatus for sending electronically stored letter contents or communication data, which overcome the hereinafore-mentioned disadvantages of the heretofore-known methods and devices of this general type and which enables automatic franking of items to be shipped containing electronically stored letter contents or communication data.

With the foregoing and other objects in view there is provided, in accordance with the invention, a method for sending electrically stored letter contents, communications and/or data on flat information carriers, such as chip cards, requiring postal franking, which comprises transmitting letter contents or communications data from a personal computer into a memory of an information carrier with a read-write module; transmitting associated shipping data from the personal computer to a postage meter device synchronously with the transmission of the letter contents or communications data; accounting for, booking or calculating and debiting postal charges for sending the information carrier with the postage meter device on the basis of the shipping data; transmitting control data from the postage meter device to a printer for printing a postage imprint; and imprinting postage on each item intended for sending the information carrier.

These shipping data include at least the address of the receiver and may in addition include the mode of shipment, such as air mail, express letter, and so forth, along with an advertising field.

In accordance with another mode of the invention, there is provided a method which comprises printing the postage imprint on an envelope with the postage meter device.

In accordance with a further mode of the invention, there is provided a method which comprises printing the postage imprint on a strip with the postage meter device.

In accordance with an added mode of the invention, there is provided a method which comprises printing the postage imprint on a part of the surface of the information carrier with the postage meter device.

In accordance with an additional mode of the invention, there is provided a method which comprises delivering the information carrier and the envelope intended for sending each information carrier to an enveloping station, and automatically inserting the information carriers into the envelopes with the enveloping station.

In accordance with yet another mode of the invention, there is provided a method which comprises printing the address on the item to be shipped in addition to the postage imprint.

In accordance with yet a further mode of the invention, there is provided a method which comprises printing the address in the form of a bar code.

In accordance with yet an added mode of the invention, there is provided a method which comprises transmitting address data to a special address printer, and printing out the address data with the special address printer.

With the objects of the invention in view, there is also provided an apparatus for sending electrically stored letter contents, communications and/or data on flat information carriers, such as chip cards, comprising a personal computer, a read-write module for transmitting letter contents or communications data from the personal computer into a memory of an information carrier requiring postal franking, a postage meter device receiving associated shipping data from the personal computer synchronously with the transmission of the letter contents or communication data, the postage meter device having means for accounting for postal charges for sending the information carrier on the basis of the shipping data, and a printer receiving control data from the postage meter device for printing a postage imprint on each item intended for sending the information carrier.

The read-write module may be integrated into the personal computer; the postage meter device may be integrated into the personal computer; the postage meter device may form a structural unit with the read-write module; or an enveloping station for automatically inserting the information carriers into envelopes, may form a structural unit with the read-write module and the postage meter device.

The advantage of the invention is that carriers of electronically stored letter contents or communication data can be franked and shipped automatically.

Other features which are considered as characteristic for the invention are set forth in the appended claims.

Although the invention is illustrated and described herein as embodied in a method and apparatus for sending electronically stored letter contents or communication data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The drawing is a schematic circuit diagram including diagrammatic perspective views which are used to illustrate the invention.

DESCRIPTION OF THE PREFERRED EMBODIMENT

Referring now to the single figure of the drawing in detail, it is seen that communication data or letter contents which are produced, for instance, by a personal computer PCA of a sender, are transmitted to an information carrier IC through a read-write module SL, which is connected to the personal computer PCA through a standard interface. Information carriers IC of this kind are known, for instance, in the form of electronic notebooks, patient passes, or debit cards. The letter contents or communication data may include texts, excerpts from data banks, program files or other electronically storable information. The read-write module SL may be constructed as a separate unit and be connected to the personal computer PCA through a standard interface, or it may be integrated with the personal computer.

The sending or shipping data, which include at least an address, are transmitted in synchronism with the output of the letter contents or communication data to a postage meter device FE connected to the personal computer PCA. These address data may, for instance, originate from an address data bank stored in memory and managed in the personal computer PCA. They may also be input by a word processing system and identified especially as shipping data. Data that identify the sender, in the form of an advertising field, can be added to these address data in the same way. If a special mode of shipment is desired, such as air mail, express letter, and so forth, these data can also supplement the shipping data. The shipping data are compared with a stored postage table and a suitable postage is calculated. The inclusion of a weight value in the postage calculation becomes unnecessary, since the information carrier IC always has the same weight, regardless of the scope of the letter contents or communication data stored in memory.

The postage meter device FE includes a secured postage meter that contains bookkeeping means BM and a printer DW. The bookkeeping means BM debits the postage value from a postage account, in a known manner. The postage account can be recharged if necessary by the usual methods, such as deposits made by telephone or the like. According to a specialized variant embodiment, bookkeeping of the postage value is carried out by means of an electronic data carrier in the form of a card, which is inserted for this purpose into a read-write device of the postage meter device FE, in the course of which debiting from the amount in the postage account of the data carrier is performed. The advertising field that is loaded into the postage meter device FE and can be printed out by it can also be stored in memory on the data carrier. The charges calculated in this way are transmitted, along with the data on the shipment type and the advertising field, to the printer DW that is used to print the postage imprint. The postage meter device FE may be constructed as a separate unit or may be integrated with the personal computer PCA. The latter variant is shown in co-pending U.S. Application Ser. No. 709,653, filed Jun. 3, 1991, now U.S. Pat. No. 5,257,197.

When the information carrier IC is sent conventionally in a letter-type envelope, a postage imprint is made on the envelope by means of the printer DW. A delivery, enveloping, and envelope closure station ZKS connected to it serves the purpose of further automatic processing.

According to another variant embodiment, the read-write module SL, the postage meter device FE and the enveloping station ZKS form one structural unit. This unit is connected to the personal computer PCA through a serial interface. In that case, the user inserts the information carrier IC that is to be written into, into the unit. The letter contents or communication data to be shipped and the shipping data are generated by means of the personal computer PCA and are transmitted to the unit through the serial interface which, for example, may be a V 24 interface. The unit produces a franked envelope, which contains the written-into information carrier IC. If a window-type envelope is used, it becomes unnecessary to additionally print an address, and the mail is already ready to be sent in this form.

According to another variant embodiment, the printer DW prints a postage meter strip, which is then applied adhesively to the information carrier IC.

Direct printing of the postage meter data and address data on part of the surface of the information carrier IC, which is prepared for this purpose, is also possible. The address data can also be printed in the form of a bar coded for automatic sorting purposes.

Control signals that are generated by a special control program of the personal computer PCA assure the synchronism of the output of the data of the letter contents or communication data, franking of the item to be shipped, and optionally the automatic insertion of the applicable information carrier IC into an envelope.

According to another variant embodiment, the address information that is read out for calculating the postage value is printed out in addition to the postage imprint. To this end, the postage meter device FE must be equipped with a printer that is suitable for printing a postal address. For instance, a heat-transfer printer can be used for this purpose which has a printing width that encompasses both the postage imprint and the address imprint. Alternatively, it is also possible to transmit the address data to a special address printing unit.

The shipping service, such the postal service or a courier service, conveys the information carrier IC to the receiver. There, the information content is read out of the information carrier IC by means of a read-write module LS coupled to a personal computer PCE or the receiver.

We claim:

1. A method for shipping flat information carriers having electronic data stored thereon and requiring postal franking, which comprises transmitting communication data from a personal computer into a memory of an information carrier with a read-write module; transmitting associated shipping data from the personal computer to a postage meter device synchronously with the transmission of the communication data; accounting for postal charges for sending the information carrier with the postage meter device on the basis of the shipping data; imprinting postage on a strip with the postage meter device and then attaching the imprinted strip to a surface of the information carrier.

2. The method according to claim 1, wherein the shipping data include an address, and wherein the method further comprises printing the address on the information carrier.

3. The method according to claim 2, which comprises printing the address in the form of a bar code.

* * * * *